US006613381B1

(12) United States Patent
Bredahl et al.

(10) Patent No.: US 6,613,381 B1
(45) Date of Patent: Sep. 2, 2003

(54) THERMOPLASTIC ADDITIVES FOR HOT MELT ADHESIVES BASED ON NON-THERMOPLASTIC HYDROCARBON ELASTOMERS

(75) Inventors: Timothy D. Bredahl, Cottage Grove, MN (US); Sheila F. Cox, St. Paul, MN (US); Patrick D. Hyde, Burnsville, MN (US); Daniel C. Munson, Maplewood, MN (US); Gregg A. Patnode, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 134 days.

(21) Appl. No.: 09/762,155

(22) PCT Filed: Oct. 20, 2000

(86) PCT No.: PCT/US00/29083

§ 371 (c)(1),
(2), (4) Date: Feb. 2, 2001

(87) PCT Pub. No.: WO02/34859

PCT Pub. Date: May 2, 2002

(51) Int. Cl.$^7$ .......................... B05D 5/10; C09J 121/00; C09J 201/00
(52) U.S. Cl. ................................. 427/207.1; 427/208.4
(58) Field of Search ............................ 427/207.1, 208.4

(56) References Cited

U.S. PATENT DOCUMENTS 4,497,936 A  *  2/1985  Tancrede et al. ............ 525/211
5,539,033 A     7/1996  Bredahl et al. ............. 525/270
6,063,838 A     5/2000  Patnode et al. ............. 523/172
6,150,017 A    11/2000  Burmeister et al. ...... 428/355 R
6,166,110 A    12/2000  Bredahl et al. ............. 523/348

FOREIGN PATENT DOCUMENTS

| EP | 854178 | 7/1998 |
| JP | 49-009547 | * 1/1974 |
| JP | 53-049031 | * 5/1978 |
| JP | 54162737 | 12/1979 |
| JP | 55-139444 | * 1/1980 |
| JP | 57085870 | 5/1982 |
| JP | 01306450 | 12/1989 |
| WO | WO 97/23577 | 7/1997 |
| WO | WO 99/61543 | 12/1999 |

OTHER PUBLICATIONS

Dictionary of Rubber, K.F. Heinisch, pp. 359–361, by John Wiley & Sons, New York (1974).
"Mixing in Single–Screw Extruders," *Mixing in Polymer Processing*, edited by Chris Rauwendaal, Marcel Dekker Inc.: New York, pp. 129, 176–177 and 185–186 (1991).

* cited by examiner

*Primary Examiner*—Erma Cameron

(57) ABSTRACT

The invention is directed toward a hot melt adhesive composition and processes for producing the same. The hot melt adhesive composition comprises: at least one non-thermoplastic hydrocarbon elastomer; at least one thermoplastic additive, wherein a ratio of melt viscosity of the at least one thermoplastic additive to melt viscosity of the at least one non-thermoplastic hydrocarbon elastomer is less than about 1:20 when measured at a shear rate of 100 seconds$^{-1}$ at a particular hot melt processing temperature; and at least one modifier.

48 Claims, No Drawings

THERMOPLASTIC ADDITIVES FOR HOT MELT ADHESIVES BASED ON NON-THERMOPLASTIC HYDROCARBON ELASTOMERS

FIELD OF THE INVENTION

The present invention relates generally to thermoplastic additives useful in preparing hot melt adhesives based on non-thermoplastic hydrocarbon elastomers and processes employing the same.

BACKGROUND OF THE INVENTION

Adhesives based on non-thermoplastic hydrocarbon elastomers, such as natural rubber, butyl rubber, synthetic polyisoprene, ethylene-propylene, polybutadiene, polyisobutylene, or styrene-butadiene random copolymer rubber, are known in the art. Hot melt processing of such adhesives is also known.

In order to facilitate efficient hot melt processing of non-thermoplastic hydrocarbon elastomers into adhesives, processing aids are typically used to lower the overall molecular weight of the adhesive composition, decreasing its melt viscosity. As compared to the elastomer component of such adhesives, lower molecular weight processing aids, such as processing oils, elastomer oligomers, waxes, or other materials defined and described as plasticizers in *Dictionary of Rubber*, K. F. Heinisch, pp. 359–361, John Wiley & Sons, N.Y. (1974) are often needed in substantial amounts in order to accomplish this purpose.

Furthermore, relatively low molecular weight tackifiers may also be needed in order to provide adhesion or render an adhesive sufficiently tacky, such as when preparing pressure-sensitive adhesives. Substantial amounts of these tackifiers may also be needed, particularly when preparing pressure-sensitive adhesives.

U.S. Pat. No. 6,063,838 describes formation of blended pressure-sensitive adhesives. The components form a blended composition having more than one domain, wherein one domain is substantially fibrillous to schistose. Exemplified in U.S. Pat. No. 6,063,838 are blends of a thermoplastic material and elastomer (specifically, synthetic polyisoprene) that are compounded with tackifiers to form pressure-sensitive adhesives. The patent teaches that, preferably, each of the thermoplastic material and elastomer components has a similar melt viscosity. Specifically, the patent states that the ability to form a finely dispersed morphology, as claimed therein, is related to a ratio of the shear viscosity of the components at melt mixing temperatures.

In that regard, the patent further states that, when a lower viscosity material is present as the minor component, the viscosity ratio of minor to major components is preferably greater than about 1:20, more preferably greater than about 1:10. The patent also teaches that the melt viscosities of individual components may be altered by the addition of plasticizers, tackifiers, or solvents (i.e., as processing aids), or by varying mixing temperatures. The ratio of melt viscosity of the thermoplastic material to the melt viscosity of the elastomer used in the Examples ranges from 1:2.3 to 1:21, with the highest measurable melt viscosity for the elastomers used therein being 1,580 Pascal-seconds and the lowest measurable melt viscosity for the thermoplastic materials used therein being 74 Pascal-seconds, as measured according to the Melt Viscosity test in the Examples section, infra, but at a temperature of 175° C.

However, the addition of substantial amounts of relatively low molecular weight components to relatively high molecular weight elastomers often leads to poorly mixed adhesives, especially due to the typically large difference in melt viscosities between such components. Poorly mixed adhesives often result in coarse (or grainy) coatings and a corresponding reduction in adhesion of adhesive films so produced.

Mix quality becomes an even bigger concern when hot melt processing such adhesives using continuous, high throughput processing. Particularly when using continuous, high throughput processing, high shear stresses can develop in the adhesive during the early stages of the compounding process. This has the effect of raising the melt temperature of the adhesive, even to the point where molecular weight of the elastomer is affected during hot melt processing thereof. For example, molecular weight of the elastomer can be undesirably reduced (e.g., by degradation) or increased (e.g., by crosslinking). Another undesirable effect of raising the melt processing temperature is the potential for release of unpleasant odors from the compositions being melt-processed.

Attempts have been made to improve mix quality when using continuous high throughput processing. For example, see U.S. Pat. No. 5,539,033 and U.S. patent application Ser. No. 09/198,781 to Bredahl et al. However, further ways of improving mix quality of hot melt adhesives are desired. It is particularly desirable to provide ways of improving mix quality of hot melt adhesives without requiring complicated processing methods.

In addition to poorly mixed adhesives, another problem with requiring substantial amounts of processing aids to facilitate hot melt processing of adhesives is that processing aids often lower the shear strength of the resulting adhesive. As a result, the ability of the resulting adhesives to meet the demands of many high performance applications is often compromised.

While attempts at increasing the shear strength of resulting adhesives are known, they typically require complicated, and often costly, post-processing steps. One conventional method of increasing the shear strength of adhesives is by crosslinking the adhesive after its application to a substrate. For example, energy sources, such as electron beam (e-beam) or ultraviolet (UV) radiation, are commonly used to crosslink adhesives after application. These methods, however, often require an additional processing step and, thus, result in decreased processing efficiency. Furthermore, e-beam is not always desired because it is expensive and can cause damage to some backings when the adhesive is used in a tape. Similarly, UV-radiation has its limitations as a crosslinking energy source. For example, UV-radiation is often not able to be used effectively for crosslinking relatively thick adhesives due to the need for UV-radiation to penetrate throughout the entire thickness of the adhesive. As such, certain filler and pigments can not be used in adhesives when UV-crosslinking is used because they potentially interfere with penetration of UV-radiation therethrough. Furthermore, crosslinking can comprise an adhesive's ability to have sufficient pressure-sensitive adhesive properties.

It is, therefore, desirable to improve known hot melt processing of non-thermoplastic hydrocarbon elastomers for preparing adhesives having the properties needed for high performance applications, such as high-temperature masking and medical tape applications. For example, it desirable to obviate the need for post-processing the adhesive after application to a substrate. Furthermore, it is desirable to obviate the need for complicated processing steps in order to provide adhesive compositions that are adequately mixed in order to avoid coarse adhesive coatings.

SUMMARY OF THE INVENTION

The invention is directed toward a hot melt adhesive composition and processes for producing the same. The hot melt adhesive composition comprises: at least one non-thermoplastic hydrocarbon elastomer; at least one thermoplastic additive, wherein a ratio of melt viscosity of the at least one thermoplastic additive to melt viscosity of the at least one non-thermoplastic hydrocarbon elastomer is less than about 1:20 when measured at a shear rate of 100 seconds$^{-1}$ at a particular hot melt processing temperature; and at least one modifier. These compositions do not require post-processing for high performance applications. Furthermore, these compositions do not require complicated processing steps for their preparation.

DETAILED DESCRIPTION OF THE PREFERRED EMBODIMENTS

The present invention is directed toward a composition and process employing the same that is capable of producing a well-mixed hot melt adhesive suitable for many high performance applications. The invention involves the addition of at least one thermoplastic additive to a non-thermoplastic hydrocarbon elastomer forming the basis of the adhesive.

In order to facilitate the description of the invention, the following terms are used herein:

"Hot melt adhesive" refers to an adhesive having a sufficient viscosity upon softening, such that the adhesive can be hot melt processed (e.g., applied to a substrate). It is not necessary for the adhesive to actually melt at the processing temperature, but rather it must soften to the point that it can be made to flow at the processing pressure. By adjusting the processing temperature, the viscosity of the adhesive can be readily tailored for application. Hot melt adhesives of the present invention preferably have a melt viscosity at the processing temperature of about 400 Poise to about 5,000 Poise (as measured at a shear rate of 1,000 seconds$^{-1}$ using a capillary rheometer). The adhesive composition is preferably capable of being processed at a temperature less than about 200° C. In some embodiments, the adhesive composition is hot melt processable at a temperature of about 80° C. to about 200° C., and more preferably about 120° C. to about 160° C.

Hot melt adhesives advantageously reduce or eliminate the use of organic solvents in adhesives and their processing. Hot melt adhesive systems are essentially 100% solid systems. Usually, such systems have no more than about 5% organic solvents or water, more typically no more than about 3% organic solvents or water. Most typically, such systems are free of organic solvents and water. Advantageously, by reducing the use of organic solvents, special handling concerns associated therewith are also reduced.

"Pressure-sensitive adhesives (PSAs)" are well known to one of ordinary skill in the art to possess properties including the following: (1) aggressive and permanent tack, (2) adherence to a substrate with no more than finger pressure, (3) sufficient ability to hold onto an adherend, and (4) sufficient cohesive strength to be removed cleanly from the adherend. PSAs are one example of a preferred hot melt adhesive in accordance with the present invention.

"Copolymer" refers to those polymers derived from at least two chemically different monomers. For example, copolymers of the invention include conventional copolymers (i.e., those polymers derived from two chemically different monomers), as well as terpolymers.

"Non-Thermoplastic Hydrocarbon Elastomers" are hydrocarbon homopolymers or hydrocarbon copolymers. They are also referred to generally herein as "elastomers." By definition, non-thermoplastic hydrocarbon elastomers are those hydrocarbon elastomers having no measurable melting temperature as measured using Differential Scanning Calorimetry (DSC). Non-thermoplastic hydrocarbon elastomers are distinguished from block copolymers, such as styrenic-diene block copolymers, that have glassy end blocks joined to an intermediate rubbery block.

"Thermoplastic Additives" are thermoplastic materials or materials having thermoplastic properties (e.g., certain block copolymers, such as styrenic-diene block copolymers).

"Modifier" refers to those materials having a relatively low number average molecular weight (Mn) as compared to the non-thermoplastic hydrocarbon elastomer. Modifiers of the invention include tackifiers, processing aids, and other adjuvants.

"Tackifier" refers to a material having a number average molecular weight (Mn) of about 10,000 grams per mole or less and a glass transition temperature (Tg) of about −30° C. or more as measured by DSC.

"Processing aid" refers to a material having a number average molecular weight (Mn) of less than about 50,000 grams per mole and a Tg of less than about −30° C., as measured by DSC. The processing aid generally lowers the melt viscosity of the resulting adhesive composition.

"Immiscibility" or "Miscibility" of components (i.e., whether or not components are "immiscible" or "miscible") can be determined by dynamic mechanical analysis (DMA) of the resulting composition. Two or more components are said to be immiscible when DMA, by temperature and/or frequency sweep of the resulting composition, shows distinct peaks in the tangent of the phase angle shift response at defined temperatures, which suggests a distinct glass transition temperature for each of the components in the composition. On the other hand, components are said to be miscible when the resulting composition exhibits a single glass transition temperature irrespective of the number of components in the composition.

"Continuous compounding" refers to a preferred process of the invention wherein components are added directly to a device (either at a single point or in a sequence) without the need for "batch compounding" a sub-combination of components, sometimes referred to as a "pre-batch." A pre-batch is typically mixed in a separate mixer, such as an internal BANBURY-type mixer or a two-roll mill, and then transferred to another device for blending. In continuous compounding, all components are added to a single device for both mixing and blending to form an adhesive composition.

No matter whether the adhesive composition is prepared using batch or continuous compounding, as a preliminary matter, a blend of at least one non-thermoplastic hydrocarbon elastomer and at least one thermoplastic additive is formed in the early stages of compounding the adhesive composition.

While melt viscosities of each of the non-thermoplastic hydrocarbon elastomer and thermoplastic additive component can vary widely in accordance with the present invention, for optimum mix quality and efficiency, it is preferred that the ratio of melt viscosity of the thermoplastic additive to melt viscosity of the elastomer is less than about 1:20, more preferably less than 1:20, even more preferably less than about 1:25, even more preferably less than about 1:50, and even more preferably less than about 1:100. This was found to allow for the use of relatively high molecular weight elastomers, which use contributes to higher shear strengths in the resulting adhesive.

Non-Thermoplastic Hydrocarbon Elastomers

Adhesives of the invention are based on at least one non-thermoplastic hydrocarbon elastomer. Preferably, the non-thermoplastic hydrocarbon elastomer has a number average molecular weight (Mn) of greater than about 50,000 grams per mole, more preferably greater than about 100,000 grams per mole, even more preferably greater than about 500,000 grams per mole, and most preferably greater than about 1,000,000 grams per mole.

The elastomer preferably comprises at least about 15%, more preferably at least about 25%, and most preferably at least about 35%, by weight of the total adhesive composition. When more than one elastomer is used in combination, preferably at least one elastomer comprises at least 50% by weight of the total elastomer component weight.

A wide variety of elastomers and combinations thereof can be employed in the present invention. Examples of non-thermoplastic hydrocarbon elastomers include: natural rubber, butyl rubber, synthetic polyisoprene, ethylene-propylene rubber, ethylene-propylene-diene monomer rubber (EPDM), polybutadiene, polyisobutylene, and poly (alpha-olefin) and styrene-butadiene random copolymer rubbers. Those of ordinary skill in the art will recognize that other, non-exemplified, non-thermoplastic hydrocarbon elastomers will benefit from processing using thermoplastic additives according to the present invention.

Thermoplastic Additives

At least one thermoplastic additive is used in the present invention. Thermoplastic additives of the invention have a number average molecular weight (Mn) between the Mn of the non-thermoplastic hydrocarbon elastomer and the Mn of modifiers added to form the adhesive. The number average molecular weight (Mn) of each thermoplastic additive, if more than one is used, is less than the number average molecular weight (Mn) of the non-thermoplastic hydrocarbon elastomer. Furthermore, the Mn of each thermoplastic additive, if more than one is used, is greater than the Mn of the modifier or modifiers to be added to the adhesive composition.

Preferred thermoplastic additives also have a melt viscosity of about 1 Pascal-second to about 1,000 Pascal-seconds, more preferably about 5 Pascal-seconds to about 500 Pascal-seconds, and most preferably about 5 Pascal-seconds to about 100 Pascal-seconds, when measured at the hot melt processing temperature (e.g., 177° C.) according to the Melt Viscosity Test in the Examples section, infra. Thermoplastic additives having a melt viscosity of less than about 30 Pascal-seconds are particularly preferred for certain embodiments.

The thermoplastic additive preferably comprises at least about 1% to about 60%, preferably about 5% to about 40%, and more preferably about 5% to about 20%, by weight of the composition based on total weight of the non-thermoplastic hydrocarbon elastomer. Generally, when the Mn of the thermoplastic additive increases, more thermoplastic additive is used. Conversely, when the Mn of the thermoplastic additive decreases, less thermoplastic additive is used.

Preferably, the thermoplastic additive is immiscible with the non-thermoplastic hydrocarbon elastomer component of the invention. Immiscibility of these two adhesive components is thought to contribute to physical reinforcement of coatings produced from hot melt adhesives of the invention. This physical reinforcement is thought to reduce or eliminate the need for post-processing of adhesive coatings, which is conventionally required to impart sufficient shear strength to the adhesive coating.

A wide variety of thermoplastic additives and combinations thereof can be employed in the present invention. For example, the thermoplastic additive may comprise thermoplastic homopolymers and thermoplastic copolymers.

Preferred thermoplastic homopolymers include polyolefins. Examples of polyolefins include: (meth)acrylates, polypropylenes (e.g., isotactic polypropylene), polyethylenes (e.g., low density polyethylene (including linear versions), medium density polyethylene, high density polyethylene, and chlorinated polyethylene), polybutylene, polyesters, polyamides, fluorinated thermoplastics (e.g., polyvinylidene fluoride and polytetrafluoroethylene), polystyrenes, and combinations thereof. A particularly preferred thermoplastic homopolymer is polyethylene.

Preferred thermoplastic copolymers include polyolefin copolymers. Examples of polyolefin copolymers include: block copolymers, such as styrene-isoprene-styrene (SIS), and ethylene-derived copolymers, such as ethylene vinyl acetate, ethylene vinyl alcohol, ethylene (meth)acrylic acid copolymers, fluorinated ethylene/propylene copolymers, ethylene/α-olefin copolymers (ethylene/propylene copolymer), metallocene-catalyzed versions thereof, and combinations thereof. Particularly preferred thermoplastic copolymers include ethylene vinyl acetate and styrene-isoprene-styrene copolymers.

Specific examples of suitable thermoplastic elastomers are commercially available from a series under the trade designations KRATON D-1107 and KRATON G-1726X from Kraton Polymers; Houston, Tex. Further examples of thermoplastic elastomers include: ELVAX 205W, ELVAX 220, ELVAX 260, ELVAX 410, ELVAX 420, and ELVAX 200W, all ethylene vinyl acetates, available from E.I. DuPont de Nemours; Wilmington, Del.; ESCORENE MV-02520 available from ExxonMobil Chemical; Houston, Tex., and ASPUN 6806 polyethylene obtained from Dow Chemical Company; Midland, Mich. Those of ordinary skill in the art will recognize that other, non-exemplified, thermoplastic additives can also be used according to the present invention.

Modifiers

In preferred embodiments, at least one modifier is compounded with the non-thermoplastic hydrocarbon elastomer/thermoplastic additive blends of the invention. Preferably, modifiers of the invention have a Mn of less than about 50,000 grams per mole. However, while the present invention is particularly useful when adding modifiers to an adhesive composition, such an addition is not necessary.

Typically, however, when preparing adhesives of the invention, at least one tackifier is added to the adhesive composition. Tackifiers can impart tack and, thus, pressure-sensitive adhesive properties, to the resulting composition.

Examples of useful tackifiers include rosins and rosin derivatives, hydrocarbon resins (including both aromatic hydrocarbon resins and aliphatic hydrocarbon resins), and terpene resins, etc. Suitable aliphatic hydrocarbon tackifiers are commercially available under the trade designation, ESCOREZ 1304, from ExxonMobil Chemical; Houston, Tex. and PICCOTAC B from Hercules Incorporated; Wilmington, Del. Typically the tackifier comprises about 10 to about 200 parts by weight per 100 parts by weight of the elastomer.

Preferably, the tackifiers are miscible with the non-thermoplastic hydrocarbon elastomer. When more than one tackifier is used, it is preferable to first add the tackifier that is most miscible with the non-thermoplastic hydrocarbon elastomer.

Other modifiers that can be compounded with the non-thermoplastic hydrocarbon elastomer/thermoplastic additive blend include, for example: antioxidants, fillers, processing aids, odor maskants (e.g., vanilla and cinnamon), foaming aids (e.g., blowing agents and expandable microspheres), curatives, and combinations thereof.

Processing

Processing of the adhesive compositions involves both mixing (also referred to herein as compounding or masticating) and coating steps. Depending on the equipment and techniques used, both processing steps may take place in a single compounding and coating line. However, this is not necessary for practice of the present invention.

The present invention is useful in both batch and continuous compounding processes. Using either batch or continuous compounding, the components may be compounded using, for example, physical blending.

Physical blending devices that provide dispersive mixing, distributive mixing, or a combination of dispersive and distributive mixing are also useful in preparing adhesive compositions of the invention. As described above, both batch and continuous methods of physical blending can be used. Examples of batch methods include using the following equipment: BRABENDER (using a BRABENDER PREP CENTER, available from C.W. Brabender Instruments, Inc.; South Hackensack, N.J.) or BANBURY internal mixing and roll milling (using equipment available from FARREL COMPANY; Ansonia, Conn.).

Preferably, however, a continuous compounding process is used to prepare adhesives of the invention. Examples of continuous methods include those using the following types of equipment and processing: single screw extruding, twin screw extruding, disk extruding, reciprocating single screw extruding, and pin barrel single screw extruding. The continuous methods can include utilizing both distributive elements, such as cavity transfer elements (e.g., CTM, available from RAPRA Technology, Ltd.; Shrewsbury, England) and pin mixing elements, static mixing elements and dispersive elements (e.g., MADDOCK mixing elements or SAXTON mixing elements as described in "Mixing in Single-Screw Extruders," *Mixing in Polymer Processing,* edited by Chris Rauwendaal (Marcel Dekker Inc.: New York (1991), pp. 129, 176–177, and 185–186).

In a continuous compounding process, the thermoplastic additive is generally added to the non-thermoplastic hydrocarbon elastomer prior to the first mastication section of the melt processing equipment. This addition helps to lower the apparent melt viscosity of the elastomer and masticate produced therefrom after the first mastication section of the processing equipment, without significantly reducing the overall molecular weight of the elastomer. This, in turn, allows for efficient addition of modifiers at significantly lower mix intensities (i.e., shear rates), which results in lower melt processing temperatures for the adhesive. Lower melt processing temperatures facilitate higher retained molecular weight of the elastomers (e.g., due to less thermal degradation) and less odor during processing of the adhesive. Another benefit of the invention is increased shear strength provided by physical reinforcement of the adhesive after coating.

Continuous compounding in accordance with the present invention is particularly advantageous in order to achieve relatively high throughput rates where the adhesive composition components have widely different viscosities and molecular weights. For high throughput rates, mixing and mastication should preferably occur quickly.

A number of continuous compounding devices are known. Continuous compounding devices may comprise a single unit or a series of interconnected units. An example of a continuous compounding device useful in the present invention is a twin screw extruder having a sequential series of conveying and processing sections, such as that described in U.S. Pat. No. 5,539,033 (Bredahl et al.).

A plurality of input openings can be provided along the length of a continuous extruder to facilitate the addition of various components of the adhesive compositions, such as elastomers, thermoplastic additives, tackifiers, and other additives known in the art. Additions of materials that are solids at the addition temperature or solids when added are made through input ports to a partially full conveying section. Additions of materials that are liquids at the addition temperature or liquids when added may be made at any available access port to the melt. A melt pump and filter may be present, either as an integral part of the extruder or as a separate unit, to facilitate both the removal of the adhesive from the continuous compounding device and the removal of unwanted contaminants from the adhesive stream.

In one particular embodiment, the continuous compounding device has a twin screw with a sequence of conveying and processing sections that alternate with one another. A first non-thermoplastic hydrocarbon elastomer, and any other optional non-thermoplastic hydrocarbon elastomers, along with the thermoplastic additive are added to a first conveying section of the continuous compounding device. The non-thermoplastic hydrocarbon elastomer may be pelletized, by grinding or extrusion pelletization for example, prior to being fed to the compounding device. Alternately, it may be fed directly into the compounding device without grinding or pelletization using a device such as a dual helical feed screw extruder (e.g., a MORIYAMA-type extruder), a two-stage, single screw extruder (e.g., from Bonnot Company; Uniontown, Ohio), or a two-roll feed, single screw extruder (e.g., from Davis Standard Corporation; Pawtuck, Conn.). If the elastomer has been pelletized, it is preferably treated with a material, such as talc, to prevent agglomeration of the pellets. The components are then transported to a first processing section where they are masticated and mixed for a time sufficient to produce a masticate having a melt viscosity less than the melt viscosity of the first non-thermoplastic hydrocarbon elastomer prior to masticating and mixing.

Modifiers, and any other optional non-thermoplastic hydrocarbon elastomers, are then added sequentially and mixed at rates such that the first non-thermoplastic hydrocarbon elastomer in the masticate is not lubricated to the point that mix efficiency is lost. For high throughput processing, preferably the adhesive composition produced thereby is effectively produced at a throughput of greater than about 45 kilograms per hour per square meter, more preferably greater than about 90 kilograms per hour per square meter, and most preferably greater than about 135 kilograms per hour per square meter, cooling wall of the continuous compounding device.

In this embodiment, the masticate produced in the first conveying and processing sections is transported to a second conveying, where it is cooled. Tackifier can be added to the masticate at this point. The masticate is then subsequently transported to a second processing section. In the second processing section, the tackifier and masticate is masticated and mixed together to form a masticate wherein melt viscosity of this masticate is further reduced from the melt viscosity of the masticate produced in the first conveyed and processing sections. The masticate is then transported to a third conveying section, where it is cooled. Other components can be added to the masticate in a third conveying section. In one embodiment, a second non-thermoplastic hydrocarbon elastomer is added to the masticate. Preferably, in this embodiment, the first non-thermoplastic hydrocarbon elastomer comprises an aliphatic elastomer and the second non-thermoplastic hydrocarbon elastomer comprises an aromatic elastomer.

In this embodiment, the melt viscosity of each masticate produced is sequentially lowered. Advantageously, as a result, the adhesive composition produced thereby is well mixed (i.e., substantially homogeneous), even at the relatively high throughput rates in preferred embodiments.

By "substantially homogeneous" it is meant that all components are uniformly mixed in the composition, such that the composition has a relatively smooth consistency (i.e., the composition is substantially free of macroscopic agglomerates visible to the unaided eye). "Substantially free" refers to preferably less than about 5% by volume based on the total volume of the composition of macroscopic agglomerates being visible to the unaided eye. It is contemplated that substantially homogeneous does not mean that the components need be miscible. That is, substantially homogenous compositions of the invention often include more than one phase, as determined by dynamic mechanical analysis (DMA). This is preferable for physically reinforcing adhesive compositions produced thereby, reducing or eliminating the need for post-processing of adhesive coatings to impart sufficient shear strength for high performance applications.

A number of techniques may be used to feed raw materials to the continuous compounder. For example, a constant rate feeder, such as a loss-in-weight feeder commercially available from Acrison, Inc.; Moonachie, N.J., may be used to feed solid materials to the compounding device. Heated pail unloaders, gear pumps (including those in combination with grid melters), and other appropriate equipment for feeding liquids at a controlled rates may be used to feed the liquids to the compounding device. Components present in low concentrations may also, optionally, be pre-blended with one or more of the other components for more accurate addition.

Hot melt coating techniques are used to form a coating from the adhesive composition. For example, the compounded adhesive composition may be introduced into a vessel to soften, pressurize, and transport the composition to a coating device. This can be done conveniently through a heated, single screw extruder, gear pump, or other similar device.

When using continuous processing, a change of equipment is often not necessary for forming a coating of the adhesive composition so produced. The adhesive composition may be discharged from the continuous compounding device into a storage container for later additional processing or use. Alternatively, it may be coated onto a substrate in the form of a film, using any additional equipment that may be necessary.

The hot melt adhesive is readily applied to a substrate. For example, the hot melt adhesive can be applied to sheeting products (e.g., decorative, reflective, and graphical), labelstock, and tape backings. The substrate can be any suitable type of material depending on the desired application. Typically, the substrate comprises a nonwoven material, woven material (e.g., cloth), metal (e.g., foil), rubber (including calendered rubber and foamed rubber), other foamed materials, paper, polypropylene (e.g., biaxially oriented polypropylene (BOPP)), polyethylene, polyester (e.g., polyethylene terephthalate), release liner (e.g., siliconized liner), and laminates thereof.

Thus, hot melt adhesives according to the present invention can be utilized to form tape, for example. To form a tape, the hot melt adhesive is coated onto at least a portion of a suitable backing. A release material (e.g., low adhesion backsize) can be applied to the opposite side of the backing, if desired. When double-sided tapes are formed, the hot melt adhesive is coated onto at least a portion of both sides of the backing.

The adhesive compositions can be coated onto a substrate using any suitable method. For example, the compositions can be delivered out of a die (including both drop dies and surface contacting dies) and/or a calender and then coated onto a substrate. The composition is either delivered to the substrate by contacting the drawn adhesive composition with a moving web (e.g., plastic web) or other suitable substrate, or delivered to a stationary substrate.

A related coating method involves extruding the composition and a coextruded backing material from a coextrusion die and cooling the layered product to form a multi-layered construction, such as an adhesive tape. After forming by any of these continuous methods, the resulting films or constructions can be solidified by quenching using both direct methods (e.g., chilled rolls or water baths) and indirect methods (e.g., air or gas impingement).

The coated adhesive may optionally be crosslinked by exposure to radiation, such as electron beam or ultraviolet radiation, to enhance the cohesive strength of the material. Crosslinking may be carried out in-line with the coating operation or crosslinking may occur as a separate process. The degree of crosslinking achieved is a matter of choice and is dependent upon a number of factors, such as the end product desired, the type of non-thermoplastic hydrocarbon elastomer used, the thickness of the adhesive layer, etc. Techniques for achieving crosslinking via post-processing of adhesive coatings are known to those of skill in the art.

A process in accordance with the present invention overcomes the disadvantages of conventional processing and mixing techniques, such as those discussed above. Further, a process in accordance with the present invention permits the processing of elastomers, especially non-thermoplastic hydrocarbon elastomers, preferably high molecular weight non-thermoplastic hydrocarbon elastomers, at high throughput rates and lower process temperatures and with a higher retained elastomer molecular weight than previously possible. Advantageously, a method in accordance with the present invention can be utilized without the need to employ either organic solvents or low molecular weight processing aids.

In addition, the process of the invention can accommodate even high molecular weight hydrocarbon elastomers at relatively high throughput rates, wherein "high molecular weight elastomer" refers to an elastomer having a viscosity average molecular weight ($M_V$) of 250,000 or more. Conventionally, such elastomers could only be compounded and applied if solvent or water processing techniques were utilized, if significant amounts of low molecular weight processing aids were employed, or at low throughput rates.

The Examples below demonstrate preferred embodiments of the invention. All parts recited are parts by weight, unless otherwise noted. For example, some parts are based on one hundred parts by weight of the non-thermoplastic hydrocarbon elastomer and are referred to in phr.

When no thermoplastic additive was used in the particular composition exemplified below, the Example is referred to as a "Comparative Example." Accordingly, when a thermoplastic additive was used in the composition, the Example is referred to simply as an "Example." Please not, however, that not all of the following "Examples" meet all criteria set forth in the appended claims.

EXAMPLES

TEST MEHODS

Drop Shear Test

The drop shear test is designed to indicate the degree of shear strength of pressure-sensitive adhesives (PSAs). The test was generally run at controlled temperature and humidity (CTH) conditions at approximately 22° C. and 45% relative humidity. However, a temperature of 104° C. was used in Examples 53–55 and Comparative Example C12.

The test consisted of placing two one-half inch (1.2 centimeters) wide strips of tape that have been aged for at least 24 hours. The strips of tape were then adhered face-to-face so that they overlapped by 1.2 centimeters. The two strips were then pressed together by rolling with a weighted roll in a standard manner.

When a temperature of 22° C. was used, the strips are then tensioned by the application of a force of 1,750 grams applied between the free ends of the two strips. When a temperature of 104° C. was used, a weight of 25 grams was similarly used.

The time for the face-to-face bond to fail (by sliding apart) is denoted as the drop-shear. The longer the time before failure, the greater the shear strength of the PSA.

Adhesion to Steel Test

The Adhesion to Steel (ATS) test is a slight modification of PSTC-1 and ASTM D-3330 in that steel is the substrate and the peel rate is 12 inches per minute (30.5 centimeters/minute).

Adhesion to Glass Test

The Adhesion to Glass (ATG) is a slight modification of PSTC-1 and ASTM D-3330 in that glass is the substrate and the peel rate is 90 inches per minute (229 centimeters/minute).

Unwind Test

The Unwind Test is a slight modification of PSTC-8 and ASTM D-3811 in that a peel rate of 229 centimeters/minute was used. This test provides a measure of unwind force for a tape.

Extrudate Seed Count Test

The Extrudate Seed Count Test is a method for counting undispersed elastomer particles that are visible to the unaided human eye (i.e., the particles are on the order of 100 micrometers in diameter or greater). A 12-inch-long (30.5 centimeters) piece of extrudate is cut in half by forcing the extrudate to split around a wooden tongue depressor. The surface of the split extrudate is examined for undispersed elastomer particles that are counted. This process is replicated two more times. The Extrudate Seed Count is the number of undispersed rubber particles averaged over three measurements.

Coating Seed Count Test

The Coating Seed Count Test is a method for counting undispersed elastomer particles that are visible to the unaided human eye (i.e., the particles are on the order of 100 micrometers in diameter or greater). A 36-inch-long (91.4 centimeters) by 5-inch-wide (12.7 centimeters) piece of PSA-coated film is examined for undispersed elastomer particles that are counted. This process is replicated two more times. The Coating Seed Count is the number of undispersed rubber particles averaged over three measurements.

Inherent Viscosity Test

The inherent viscosity (IV) is directly related to polymer molecular weight. This test is based on ASTM D 2857-70 and was used to characterize the IV of natural rubber that had been compounded in the absence and in the presence of various immiscible additives. Extruded blends of natural rubber and ethylene vinyl acetate (EVA) were dissolved in heptane. The dissolved solution was centrifuged to separate the undissolved EVA from the heptane/natural rubber solution. The IV of a 10 milliliter portion of a 0.5 gram per deciliter solution of the sample in heptane was then measured using a CANON-FENSKE-type, size 150 viscometer in a water bath controlled at 25° C.

Melt Viscosity Test

The melt viscosity for materials was determined using an INSTRON Model 3210 tester (obtained from Instron Corporation; Canton, Mass.) utilizing cross head speeds from 0.1 to 20 inches per minute (2.54 to 508 millimeters per minute) at material temperatures of 135° C. and 177° C. and at a shear rate of 100 seconds$^{-1}$.

Hot Removal From Painted Steel

Tape samples were bonded to a painted steel panel using a 2,040 gram rubber roller. The bonded panel was placed in an oven at 104° C. After thirty minutes, the tape sample was pulled from the steel panel at 104° C. (i.e., while the bonded panel was still in the oven). The amount of adhesive that transferred to the panel upon removal, expressed as the surface coverage percentage, was then recorded as the Hot Removal from Steel.

TABLE OF ABBREVIATIONS

| Abbreviation/Trade Designation | Description |
|---|---|
| AMERIPOL 1011AC | styrene butadiene rubber (SBR) available from Ameripol Synpol Corporation; Akron, OH |
| ASPUN 6806 | a thermoplastic polyethylene resin having a melt viscosity of 89 Pascal-seconds as measured at 177° C. using the Melt Viscosity Test, supra, and obtained from Dow Chemical Company; Midland, MI |
| BUNA CB-23 | cis-1,4 polybutadiene elastomer, having melt viscosity of 2,824 Pascal-seconds as measured at 135° C. using the Melt Viscosity Test, supra, and available from Bayer Corporation - Fibers, Additives, and Rubber Division; Akron OH |
| CaCO$_3$ | calcium carbonate |
| CV60 | controlled viscosity grade natural rubber, available as an International commodity, and having a melt viscosity of 1,580 Pascal-seconds as measured at 177° C. using the Melt Viscosity Test, supra, |
| ELVAX 200W | ethylene vinyl acetate copolymer with a melt viscosity of about 5 Pascal seconds as measured at 177° C. using the Melt Viscosity |

-continued

| Abbreviation/Trade Designation | Description |
| --- | --- |
| | Test, supra, and available from E. I. DuPont de Nemours; Wilmington, DE |
| ELVAX 205W | ethylene vinyl acetate copolymer with a melt viscosity of about 14 Pascal-seconds as measured at 177° C. using the Melt Viscosity Test, supra, and available from E. I. DuPont de Nemours; Wilmington, DE |
| ELVAX 220W | ethylene vinyl acetate copolymer with a melt viscosity of about 74 Pascal-seconds as measured at 177° C. using the Melt Viscosity Test, supra, and available from E. I. DuPont de Nemours; Wilmington, DE |
| ELVAX 260 | ethylene vinyl acetate copolymer with a melt viscosity of about 938 Pascal-seconds, as measured at 135° C., and a melt viscosity of 581 Pascal-seconds, as measured at 177° C., using the Melt Viscosity Test, supra, and available from E. I. DuPont de Nemours; Wilmington, DE |
| ELVAX 410 | ethylene vinyl acetate copolymer with a melt viscosity of about 24 Pascal-seconds as measured at 177° C. using the Melt Viscosity Test, supra, and available from E. I. DuPont de Nemours; Wilmington, DE |
| ESCORENE MV-02520 | ethylene vinyl acetate copolymer with a melt viscosity of about 5 Pascal-seconds as measured at 177° C. using the Melt Viscosity Test, supra, and available form ExxonMobil Chemical; Houston, TX |
| HYDROCEROL BIH | chemical foaming agent available from Clariant Corporation; Winchester, VA |
| IRGANOX 1010 | antioxidant, available from Ciba Specialty Chemicals Corporation; Tarrytown, NJ |
| KRATON D-1107 | styrene-isoprene-styrene (SIS) thermoplastic elastomer with a melt viscosity of about 1,250 Pascal-seconds as measured at 177° C. using the Melt Viscosity Test, supra, and available from Kraton Polymers; Houston, TX |
| KRATON G-1726X | styrene-ethylenebutylene-styrene thermoplastic elastomer with a melt viscosity of about 277 Pascal-seconds as measured at 177° C. using the Melt Viscosity Test, supra, and available from Kraton Polymers; Houston, TX |
| PICCOLYTE A135 | alpha-pinene tackifer, available from Hercules Incorporated; Wilmington, DE |
| PICCOTAC B | $C_5$ tackifer, available from Hercules Incorporated; Wilmington, DE |
| REGALREZ 1126 | hydrogenated aliphatic tackifer, available from Hercules Incorporated; Wilmington, DE |
| RSS NR | ribbed smoked sheet natural rubber, available as an International commodity, and having a melt viscosity of about 1,950 Pascal-seconds as measured at 177° C. using the Melt Viscosity Test, supra |
| TAKTENE 221 | cis-1,4 polybutadiene elastomer having a melt viscosity of about 3,612 Pascal-seconds as measured at 135° C. using the Melt Viscosity Test, supra, and available from Bayer Corporation - Fibers, Additives, and Rubber Division; Arkon, OH |
| VISTANEX LM-MS | low molecular weight polyisobutylene elastomer, available from ExxonMobil Chemical; Houston, TX |
| VISTANEX MM L-100 | approximately 1.25 million viscosity average molecular weight polyisobutylene elastomer having a melt viscosity of 990 Pascal-seconds as measured at 177° C. using the Melt Viscosity Test, supra, and available from ExxonMobil Chemical; Houston, TX |

All tackifiers used in Examples had a measured melt viscosity at 177° C. of less than 1 Pascal-second, as measured using the Melt Viscosity Test, supra.

Examples 1–2 and Comparative Examples C1–C2

These examples demonstrate the inventive process for melt extrusion compounding thermally sensitive synthetic polybutadiene (PB) elastomer pressure-sensitive adhesives (PSAs) with a thermodynamically immiscible thermoplastic ethylene vinyl acetate (EVA) additive. The materials were compounded in a co-rotating, intermeshing twin-screw extruder (TSE) from Werner and Pfleiderer model number ZSK-30, available from Krupp Werner & Pfleiderer; Ramsey, N.J., with 37/1 length to diameter (L/D) ratio. The TSE had a diameter of 30 millimeters with 12 barrel sections totaling 1,160 millimeters in length. The polybutadiene (PB) rubbers, TAKTENE 221, and BUNA CB-23, were pre-pelletized with talc to prevent blocking and were then fed via a K-TRON loss-in-weight gravimetric feeder (available from K-Tron International Incorporated; Pitman, N.J.) into barrel 1. EVA pellets (ELVAX 260) were also gravimetrically fed into barrel 1. The tackifer was gravimetrically fed as a dry powder at a 25/75 split into barrels 3 and 7, respectively. The total volume of materials was targeted at 20 pounds per hour (151.7 grams per minute). The screw speed was set at 250 revolutions per minute (rpm). The temperature profile of the TSE was controlled to 80° C., 195° C., 40° C., 130° C., 85° C., 80° C., 40° C., 130° C., 100° C., 110° C., 115° C., 120° C. and 115° C. in zones 1–13, respectively. A gear pump, available from Zenith Products Company; West Newton, Mass., operating at 23 rpm and 122° C., discharged the TSE flow into a flexible hose set at 128° C. that was connected to a surface contacting coating die set at 136° C. Tables 1 and 2 summarize the extruded compositions and observations, respectively.

TABLE 1

| Ex. | TAKTENE 221 (parts) | BUNA CB-23 (parts) | PICCOLYTE A135 (phr) | ELVAX 260 (phr) |
|---|---|---|---|---|
| 1 | 100 | 0 | 115 | 20 |
| 2 | 0 | 100 | 115 | 20 |
| C1 | 100 | 0 | 115 | 0 |
| C2 | 0 | 100 | 115 | 0 |

TABLE 2

| Ex. | Comments |
|---|---|
| 1 | good mix |
| 2 | good mix |
| C1 | melt viscosity too high to mix |
| C2 | melt viscosity too high to mix |

It was observed that the high shear viscosity PB rubbers were unable to be hot melt processed without the thermoplastic additive.

Examples 3–6 and Comparative Examples C3–C4

These Examples demonstrate the efficacy on the mix quality of adding a thermodynamically immiscible styrene-isoprene-styrene (SIS) thermoplastic elastomer to a melt extrusion compounded blend of high viscosity ratio liquid and solid polyisobutylene (PIB) elastomers. The materials were compounded using the same extrusion mixing and coating process as described for Examples 1 and 2 and Comparative Examples C1 and C2. A solid rubber, VISTANEX MM L-100, was pre-pelletized and gravimetrically fed with a K-TRON loss-in-weight gravimetric feeder (available from K-Tron International Incorporated; Pitman, N.J.) into barrel 1., A liquid rubber, VISTANEX LM-MS, was fed into barrel 5 using a single-stage, single screw extender, available from Bonnot Company; Uniontown, Ohio, with a metering gear pump, available from Zenith Products Company; West Newton, Mass., operating at 121° C. Hydrogenated aliphatic tackifer (REGALREZ 1126) was melted and fed into barrel 7 using a grid melter with pre-melt and progressive-melt set at 193° C. and hose temperature set at 177° C. KRATON D-1107 was gravimetrically fed with the solid rubber pellets into barrel 1. The temperature profile of the TSE was maintained at 0° C., 150° C., 150° C., 130° C., 130° C., 140° C., 135° C., 145° C., 130° C., 130° C., 140° C., 150° C. and 154° C. in zones 1–13, respectively. The TSE screw speed was varied from 300 to 400 rpm. The pump, hose, and die temperatures were also maintained at 150° C. The total material throughput in the TSE was maintained at 76 grams/minute. The gear pump revolutions per minute and web take-away speed were varied to maintain a 30 grams per square meter coating weight on a 25-micrometer-thick PET film. Table 3 summarizes the compositions and a qualitative assessment of the coating quality of the samples that were made:

TABLE 3

| Ex. | VISTAN-EX MML-100 (parts) | VISTAN-EX LM-MS (parts) | KRATON D-1107 (phr) | REGAL-REZ 1126 (phr) | Screw Speed (rpm) | Coating Seed Count |
|---|---|---|---|---|---|---|
| C3 | 100.00 | 150.00 | 0.00 | 50.00 | 400 | Many |
| C4 | 50.00 | 150.00 | 0.00 | 100.00 | 400 | Many |
| 3 | 35.00 | 150.00 | 15.00 | 100.00 | 300 | Much less than C3, C4 |
| 4 | 67.00 | 150.00 | 33.00 | 100.00 | 300 | None |
| 5 | 50.00 | 150.00 | 25.00 | 100.00 | 300 | None |
| 6 | 50.00 | 200.00 | 25.00 | 50.00 | 300 | None |

The results in Table 3 demonstrate that the addition of an immiscible styrene-isoprene-styrene (SIS) thermoplastic elastomer additive to the solid, high viscosity PIB elastomer dramatically induced the number of visible (>30 micrometers) undispersed elastomer particles, and reduced the level of mix intensity (RPM) needed to get seed free mix.

Comparative Example C5 and Example 7

Comparative Example C5 and Example 7 demonstrate the efficacy of adding an immiscible thermoplastic EVA additive cm improving the mix quality of an extruded natural rubber basal PSA. Comparative Example C5 and Example 7 were prepared using the same extrusion compounding process described for Examples 1 and 2 and Comparative Examples C1 and C2. RSS NR was pre-pelletized and gravimetrically fed at 100 parts into barrel 1 of the TSE with a K-TRON loss-in-weight gravimetric feeder (available from K-Trop International Incorporated; Pitman, N.J.). The tackifer PICCOTAC B was split into three feed streams for a total amount of 117 phr. In the first feed stream, the resin was melted at 149° C. and fed into barrel 3 at 28 phr. The second and third tackifier feed streams were gravimetrically led using a K-TRON feeder at 38 phr and 41 phr into barrel 5 and barrel 7, respectively. For the composition of Example 7, an immiscible thermoplastic additive ELVAX 260 was gravimetrically co-fed with the RSS NR into barrel 1. The TSE screw speed was set at 300 rpm. The temperature profile of the TSE was maintained at 120° C., 80° C., 140° C., 120° C. 50° C., 50° C., 60° C., 60° C., 55° C., 55° C., 55° C., 90° C. and 90° C. in zones 1–13, respectively. Samples were collected and visually examined for mix quality with the Extrudate Seed Counting test. The compositions and seed contents for Comparative Example C5 and Example 7 are detailed in Table 4.

TABLE 4

| Ex. | RSS NR (parts) | PICCO-TAC B (phr) | Additive | Additive Amount (phr) | Extruder Output (g/min) | Extrudate Seed Count |
|---|---|---|---|---|---|---|
| C5 | 100 | 107 | None | 0 | 112 | 160 |
| 7 | 100 | 107 | ELVAX 260 | 15 | 120 | 0 |

The data in Table 4 demonstrate the efficacy of improving the mix duality by adding an immiscible thermoplastic EVA additive. The presence of visually large, undispersed natural rubber particles was substantially reduced.

Examples 8–10

Examples 8–10 illustrate the affect of varying the amount of the EVA additive on the mix quality of an extruded natural rubber-based PSA. Examples 8–10 were prepared using the same extrusion compounding process described for the previous example set (Comparative Examples C5 and Example 7) except that different amounts of the ELVAX 260 EVA additive were used. Samples were collected and visually examined for mix quality by using the Extrudate Seed Counting test. The compositions and seed contents for Examples 8–10 are detailed in Table 5.

TABLE 5

| Ex. | RSS NR (parts) | PICCO-TAC B (phr) | Additive | Additive Amount (phr) | Extruder Output (g/min) | Extrudate Seed Count |
|---|---|---|---|---|---|---|
| 8 | 100 | 107 | ELVAX 260 | 7.5 | 116 | 60 |
| 9 | 100 | 107 | ELVAX 260 | 11 | 118 | 40 |
| 10 | 100 | 107 | ELVAX 260 | 15 | 120 | 0 |

The seed count results presented in Table 5 demonstrate that mix quality was continually improved by increasing the amount of ELVAX 260 from 0 to 15 phr.

Examples 11–23 and C6

Examples 11–23 and Comparative Example C6 illustrate the affect of varying the amount and type of EVA additives having different melt viscosities on the melt temperature and mix quality of an extruded natural rubber based PSA. Examples 11–23 and Comparative C6 were prepared using the same extrusion compounding process described for the previous two example sets (Comparative Examples C5 and Examples 14 10 except that different types and amounts of the EVA additives were used. Samples were collected and visually examined for mix duality by using the Extrudate Seed Count test. The compositions, additive melt viscosities measured at 147° C. and 100 seconds$^{-1}$, melt temperature measured in barrel 2, and mix quality were all assessed for extrudates of Examples 11–23 and Comparative Example C6 and are detailed in Table 6.

TABLE 6

| Ex. | Additive | Additive Amount (phr) | Additive Melt Viscosity (Pa-s) | Extruder Output (g/min) | Barrel 2 Melt Temp. (° C.) | Extrudate Seed Count |
|---|---|---|---|---|---|---|
| 6 | None | 0 | N/A | 112 | 151 | 160 |
| 11 | ELVAX 220W | 7.5 | 74 | 116 | 142 | 15 |
| 12 | ELVAX 220W | 11 | 74 | 118 | 138 | 0 |
| 13 | ELVAX 220W | 15 | 74 | 120 | 136 | 0 |
| 14 | ELVAX 410 | 7.5 | 24 | 116 | 140 | 5 |
| 15 | ELVAX 410 | 15 | 24 | 120 | 130 | 0 |
| 16 | ELVAX 410 | 30 | 24 | 128 | 129 | 0 |
| 17 | ELVAX 410 | 60 | 24 | 145 | 120 | 20 |
| 18 | ELVAX 200W | 15 | 5 | 121 | 129 | 0 |
| 19 | ELVAX 200W | 30 | 5 | 129 | 115 | 4 |
| 20 | ELVAX 200W | 45 | 5 | 137 | 110 | 40 |
| 21 | ELVAX 200W | 60 | 5 | 146 | 105 | 160 |
| 22 | ES-CORENE MV-02520 | 7.5 | 5 | 189 | 134 | 0 |
| 23 | ES-CORENE MV-02520 | 15 | 5 | 189 | 127 | 5 |

The results presented in Table 6 demonstrate that lower melt viscosity EVA additives are useful for providing lower melt temperatures and improved mix quality. For example, as the melt viscosity was progressively decreased by adding 7.5 phr ELVAX 220W, ELVAX 410, or ESCORENE MV-02520, respectively. The resulting melt temperature in barrel 2 decreased from 142° C. to 140° C. to 134° C., respectively. The corresponding seed counts progressively decreased from 15 to 5 to 0, respectively. One of the lowest viscosity additives (ESCORENE MV-02520) provided no seeds down to the lowest achievable flow rate (7.5 phr) for this compounding apparatus. We speculate that even lower amounts of this additive (e.g., 1–5 phr) would be effective at providing improved mix quality.

In summary, as the melt viscosity of the additive was decreased, the amount of additive required for achieving seed-free extrudates was reduced. The corresponding melt temperatures were also decreased, enabling the potential for lower TSE rpm to be employed. Lower TSE rpms provide for reduced energy consumption, reduced molecular weight reduction of the natural rubber component and reduced extrudate odor.

Comparative Examples C7 and Examples 24–42

Comparative Example C7 and Examples 24–42 demonstrate the affects of adding immiscible thermoplastic EVA additives on the adhesive properties of hot melt-coated natural rubber based PSA. Comparative Example C7 and Examples 24–42 were prepared using the same extrusion compounding process described for Examples 1 and 2 and Comparative Examples C1 and C2. RSS NR was pre-pelletized and gravimetrically fed into barrel 1 of the TSE with a K-TRON loss-in-weight gravimetric feeder (available from K-Tron International Incorporated Pitman, N.J.) at 100 parts. The tackifer, PICCOTAC B, was split into three feed streams for a total amount of 110 phr. In the first feed stream, the resin was melted at 149° C. and fed into barrel 3 at 28 phr. The second and third tackifier feed streams were gravimetrically fed using K-TRON feeders at 38 phr and 44 phr into barrel 5 and barrel 7, respectively. For the compositions of Example 24–42, immiscible thermoplastic EVA additives were gravimetrically co-fed with the RSS NR into barrel 1. A mixture of 125 phr CaC0$_3$ and 1 phr IRGANOX 1010 were gravimetrically fed into barrel 10. In order to provide seed-free coatings, the TSE screw speed was set at 425 rpm for Comparative Example C7 and 300 rpm for Examples 24–42. The temperature profile of the TSE was maintained at 120° C., 80° C., 140° C., 120° C., 50° C., 50° C., 60° C., 60° C., 55° C., 55° C., 55° C., 55° C. and 90° C. in zones 1–13, respectively. A gear pump, available from Zenith Products Company; West Newton, Mass., operating at 30 rpm and 140° C. discharged the TSE flow into a flexible hose set at 140° C. which was connected to a contact coating die set at 142° C. The web take-away speed was controlled to 9.1 meters per minute to maintain a 150 grams/square meter coating weight on a 25-micrometer-thick poly/cloth laminate. The adhesive-coated tapes for Comparative Examples C7 and Examples 24–42 were evaluated for drop shear, adhesion to glass (ATG) and adhesion to steel (ATS). The compositions, melt viscosities measured at 149° C. and 100s$^{-1}$ and adhesive properties for Comparative Example C7 and Examples 24–42 are detailed in Table 7.

TABLE 7

| Ex. | Additive | Additive Amount (phr) | Extruder Output (g/min) | Additive Melt Viscosity (Pa-s) | Drop Shear (min) | ATG (g/mm) | ATS (g/mm) |
|---|---|---|---|---|---|---|---|
| C7 | None | 0 | 181 | — | 2 | 106 | 64 |
| 24 | ELVAX 260 | 11 | 187 | 581 | 34 | 58 | 77 |
| 25 | ELVAX 260 | 15 | 189 | 581 | 46 | 77 | 64 |
| 26 | ELVAX 220W | 7.5 | 185 | 74 | 41 | 84 | 62 |
| 27 | ELVAX 220W | 11 | 187 | 74 | 53 | 58 | 60 |
| 28 | ELVAX 220W | 15 | 189 | 74 | 32 | 70 | 64 |
| 29 | ELVAX 220W | 22.5 | 192 | 74 | 75 | 70 | 44 |
| 30 | ELVAX 220W | 30 | 189 | 74 | 153 | 62 | 44 |
| 31 | ELVAX 220W | 45 | 189 | 74 | 458 | 62 | 39 |
| 32 | ELVAX 220W | 60 | 189 | 74 | 509 | 57 | 35 |
| 33 | ELVAX 410 | 7.5 | 189 | 24 | 1964 | 56 | 41 |
| 34 | ELVAX 410 | 15 | 189 | 24 | 2306 | 63 | 45 |
| 35 | ELVAX 410 | 30 | 189 | 24 | 6253+ | 58 | 41 |
| 36 | ELVAX 410 | 60 | 189 | 24 | 7270+ | 40 | 31 |
| 37 | ELVAX 205W | 7.5 | 189 | 14 | 520 | 57 | 36 |
| 38 | ELVAX 205W | 15 | 189 | 14 | 882 | 62 | 37 |
| 39 | ELVAX 205W | 30 | 189 | 14 | 3823 | 60 | 41 |
| 40 | ELVAX 200W | 7.5 | 189 | 5 | 661 | 57 | 39 |
| 41 | ELVAX 200W | 15 | 189 | 5 | 1047 | 60 | 40 |
| 42 | ELVAX 200W | 30 | 189 | 5 | 2690 | 60 | 36 |

The results in Table 7 demonstrate that immiscible thermoplastic EVA additives substantially increase the drop shear or cohesive strength of the natural rubber based PSAs. There was also a corresponding decrease in the adhesion to glass, and steel for most formulations. The amount of EVA additive needed for mix quality, 5-bond and adhesion can be balanced for optimal processing efficiency and tape performance.

Comparative Example C8 and Examples 43–46

Comparative Example C5 and Examples 43–46 illustrates types of additives other than EVA that are effective at providing improved mix quality and increased adhesive drop shear for hot melt coated natural rubber based PSAs. Comparative Example C8 and Examples 43–46 were prepared using the same extrusion compounding and coating process described for the previous example set (Examples 24–42 and Comparative Example C7). RSS NR was pre-pelletized and gravimetrically fed into barrel 1 of the TSE with a K-TRON loss-in-weight gravimetric feeder (available from K-Tron International Incorporated; Pitman, N.J.) at 100 parts. The tackifer PICCOTAC B was split into three feed streams for a total amount of 107 phr. In the first feed stream the resin was melted at 149° C. and fed into barrel 3 at 28 phr. The second and third tackifier feed streams were gravimetrically fed using K-TRON feeders at 38 phr and 41 phr into barrel 5 and barrel 7, respectively. For the compositions of Example 43–46, different types of additives were gravimetrically co-fed with the RSS NR into barrel 1. The different types include: (1) a low-density polyethylene (ASPUN 6806) and (2) a styrene-ethylenebutylene-styrene thermoplastic elastomer (KRATON G-1726X). A mixture of 126 phr CaC0$_3$ and 1 phr IRGANOX 1010 were gravimetrically fed into barrel 10. The TSE screw speed was set at 300 rpm. The temperature profile of the TSE was maintained at 120° C., 80° C., 140° C., 120° C., 50° C., 50° C., 60° C., 60° C., 55° C., 55° C., 55° C., 55° C. and 90° C. in zones 1–13 respectively. A gear pump, available from Zenith Products Company: West Newton, Mass., operating at 30 rpm and 140° C. discharged the TSE flow into a flexible hose set at 140° C. that was connected to a contact coating die set at 142° C. The web take-away speed was controlled to 9.1 meters/minute to maintain a 150 grams/square meter coating weight on 25-micrometer-thick poly/cloth laminate. The adhesive-coated tapes for Comparative Examples C8 and Examples 43–46 were evaluated for drop shear, adhesion to glass (ATG) and adhesion to steel (ATS). The compositions and adhesive properties are detailed in Table 8.

TABLE 8

| Ex. | Additive | Additive Amount (phr) | Extruder Output (g/min) | Coating Seed Count | Drop Shear (min) | ATG (g/mm) | ATS (g/mm) |
|---|---|---|---|---|---|---|---|
| C8 | none | 0 | 181 | 0 | 2 | 106 | 65 |
| 43 | ASPUN 6806 | 7.5 | 189 | 0 | 79 | 79 | 36 |
| 44 | ASPUN 6806 | 15 | 189 | 0 | 142 | 84 | 47 |
| 45 | KRATON G-1726X | 7.5 | 189 | 75 | 23 | 72 | 29 |
| 46 | KRATON G-1726X | 15 | 189 | 0 | 20 | 68 | 41 |

The results presented in Table 8 demonstrate that both thermoplastic polyethylene (ASPUN 6806) and thermoplastic black copolymer elastomer (KRATON G-1726X). additives provide for an increased drop shear for an extruded natural rubber based PSA.

Comparative Example C9 and Example 47

Comparative Example C9) and Example 47 illustrate the importance of the sequence of addition of the additive on achieving seed-free mix quality for an extruded natural rubber-based PSA. Comparative Example C9 and Example 47 were prepared using the same extrusion compounding method described for Comparative Examples C1–C2 and Examples 1–2. RSS NR was pre-pelletized and gravimetrically fed into barrel 1 of the TSE with a K-TRON loss-in-weight gravimetric feeder (available from K-Trop International Incorporated; Pitman, N.J.) at 100 parts. The tackifer, PICCOTAC B, was split into three feed streams for a total amount of 107 phr. In the first feed stream the resin was melted at 149° C. and fed into barrel 3 at 28 phr. The second and third tackifier feed streams were gravimetrically fed using K-TRON feeders at 38 phr and 41 phr into barrel 5 and barrel 7, respectively. For the composition of Example 47, the EVA (ELVAX 260) was gravimetrically co-fed with the RSS NR into barrel 1. For the composition of Comparative Example C9, the EVA (ELVAX 260) was gravimetrically co-fed with the PICCOTAC B solid tackifer gravimetrically into barrel 7. A mixture of 126 phr $CaCO_3$ and 1 phr IRGANOX 1010 were gravimetrically fed into barrel 10. The TSE screw speed was set at 300 rpm. The temperature profile of the TSE was maintained at 120° C., 80° C., 140° C., 120° C., 50° C., 50° C., 60° C., 60° C., 55° C., 55° C., 55° C., 55° C. and 90° C. in zones 1–13, respectively. A gear pump, available from Zenith Products Company; West Newton, Mass., operating an 30 rpm and 140° C. discharged the TSE flow into a flexible hose set at 140° C. which was connected to a contact coating die set at 142° C. The compositions and coating seed count for Comparative Example C9 and Example 47 are detailed in Table 9.

TABLE 9

| Ex. | Additive | Additive Amount (phr) | Addition Barrel | Extruder Output (g/min) | Coating Seed Count |
|---|---|---|---|---|---|
| C9 | ELVAX 260 | 15 | 7 | 189 | 300+ |
| 47 | ELVAX 260 | 15 | 1 | 189 | 0 |

The mix quality was substantially improved by adding the immiscible thermoplastic EVA component with the natural rubber elastomer prior to addition of the tackifer (Example 47). Addition of the EVA component after the tackifer was added to the natural rubber elastomer did not improve the mix quality of the extruded natural rubber based PSA (Comparative Example C9).

Comparative Example C10 and Examples 48–49

Comparative Example (10 and Examples 48–49 demonstrate the effect of the thermoplastic EVA additive on the inherent viscosity of the heptane-soluble natural rubber fraction extracted from the TSE. RSS NR was pre-pelletized and gravimetrically fed into barrel 1 of the TSE with a K-TRON loss-in-weight gravimetric feeder (available from K-Tron International Incorporated; Pitman, N.J.) at 100 parts. The tackifer, feeds were shut off for these Examples. The thermoplastic EVA additives were gravimetrically co-fed with the RSS NR into barrel 1. The TSE screw speed was set at 300 rpm. The temperature profile of the TSE was maintained at 120° C., 80° C., 140° C., 120° C., 50° C., 50° C., 60° C., 60° C., 55° C., 55° C., 55° C., 55° C. and 90° C. in zones 1–13 respectively. Table 10 contains the compositions that were collected from barrel 3 of the TSE. The compositions were dissolved in n-heptane, a non-solvent for the EVA but a good solvent for the natural rubber. Table 10 summarizes the compositions and the inherent viscosities of the centrifuged n-heptane soluble fractions as measured by the Inherent Viscosity Test.

TABLE 10

| Ex. | RSS NR (parts) | ELVAX 260 (phr) | ELVAX 200W (phr) | Additive Melt Viscosity (Pa · s) | Inherent Viscosity (g/dL) |
|---|---|---|---|---|---|
| 10 | 100 | 0 | 0 | N/A | 2.35 |
| 48 | 100 | 15 | 0 | 581 | 2.45 |
| 49 | 100 | 0 | 15 | 5 | 2.72 |

Two results can be drawn from the inherent viscosity (IV) analysis presented in Table 10: (1) addition of EVA to the mural rubber elastomer increases the elastomer IV (compare C10 and Examples 48–49), and (2) decreasing the melt viscosity of the EVA also increases the elastomer IV (compare Ex. 48 and Ex. 49). In either case, the relative increase in IV corresponds to a relatively higher elastomer molecular weight, a consequence of reduced mechanical degradation afforded by the presence of the immiscible thermoplastic additive.

Comparative Example C11 and Example 50

Comparative Example C11 and Example 50 demonstrate the effects of adding an immiscible thermoplastic EVA additive on the mix quality and melt temperature of a natural rubber based PSA extruded at processing throughputs greater than 350 pounds per hour (159 kilograms/hour). The compounder design employed was that of a Werner and Pfleiderer model number ZSK-90, available from Krupp Werner & Pfleiderer: Ramsey, N.J., with a 90 millimeter diameter barrel having a length of 3,360 millimeters.

RSS NR was fed as a masticate from a two-stage, single screw extruder, available from Bonnot Company;. Uniontown, Ohio, at barrel 2 of the TSE at a rate of 98 kilograms/hour. ELVAX 260 pellets were fed gravimetrically added to barrel 1 at 14.5 kilograms/hour for Example 48. The TSE screw operated at 225 rpm for Comparative Example C11 and 200 rpm for Example 50. The EVA and RSS NR were transported from barrel 1 and barrel 2 to barrel 3 and were masticated. PICCOTAC B was fed as a melt to barrel 4 and gravimetrically added to barrels 6 and 8 at rates of 6.5 kilograms/hour, 38.3 kilograms/hour and 30.7 kilograms/hour, respectively, for a total resin feed rate of 65.5 kilograms/hour. $TiO_2$ was gravimetrically fed into barrel 11 at 2.0 kilograms/hour. The TSE temperature profile was maintained at 40° C. For all barrels 1–14 The extrudates for Comparative Example C11 and Example 50 were examined for mix quality using the Extrudate Seed counting test. The compositions, melt temperature measured in barrel 3 and the seed counts are detailed in Table 11.

TABLE 11

| Ex. | RSS NR (parts) | ELVAX 260 (phr) | PICCOTAC B Total (phr) | $TiO_2$ (phr) | Extruder Output (kg/hr) | Melt Temp. (° C.) | Extrudate Seed Count |
|---|---|---|---|---|---|---|---|
| C11 | 100 | 0 | 67 | 2 | 165 | 194 | 1000 |
| 50 | 100 | 15 | 67 | 2 | 183 | 182 | 0 |

The addition of the immiscible thermoplastic EVA to the extruded natural rubber PSA composition of Comparative Example C11 to make example 50 resulted in substantially improved mix quality (reduced seed count) at lower RPM (200 versus 225) and melt temperatures.

Examples 51–52

Examples 51–52 demonstrate the benefits of varying the amount of the thermoplastic EVA additive on the mix quality and melt temperature of a natural rubber based PSA extruded at processing throughputs greater than 159 kilograms/hour. Examples 51–52 were prepared using the same high throughput compounding process described for Comparative Example C11 and Example 50, with a slightly different ratio of RSS NR to PICCOTAC B resin and ELVAX 260 amounts. The melt temperature measured in barrel 3 and the seed counts for Examples 51–52 are detailed in Table 12.

TABLE 12

| Ex. | RSS NR (parts) | ELVAX 260 (phr) | PICCO-TAC B Total (phr) | TiO$_2$ (phr) | Extruder Output (kg/hr) | Melt Temp. (° C.) | Extrudate Seed Count |
|---|---|---|---|---|---|---|---|
| 51 | 100 | 15 | 71 | 2 | 183 | 183 | 250 |
| 52 | 100 | 20 | 71 | 2 | 188 | 179 | 0 |

Increasing the amount of ELVAX 260 from 15 to 20 phr for this level of rubber and resin substantially improved the mix duality (reduced seed count) and also reduced the melt temperature. As mentioned earlier, reduced melt temperatures allow for a reduction in screw rpm which leads to lower energy consumption and reduced elastomer molecular weight reduction.

Comparative Example C12 and Examples 53–55

Comparative Example C12 and Examples 53–55 demonstrate the benefits of adding immiscible thermoplastic EVA additives to extruded natural rubber haled PSAs for masking tape applications. Comparative Example C12 and Examples 53–55 were made using the same extrusion compounding process described for Comparative Example C11 and Example 50.

For Comparative Example C12, CV60 (natural rubber) and AMERIPOL 1011AC (SBR) were ground and dusted with talc. The CV60 and AMERIPOL 1011AC were gravimetrically added to barrel 1 of the TSE at rates of 21.2 kilograms/hour, and 15.3 kilograms/hour, respectively. The TSE screw speed was set at 150 rpm. The elastomers CV60 and AMERIPOL 1011AC, were transported from barrel 1 to barrel 2 and then barrel 3 and were masticated in barrel 3. PICCOTAC B was gravimetrically added to barrel 7 and barrel C8 at a rate of 8.75 kilograms/hour, and 10.2 kilograms/hour, respectively. An antioxidant, IRGANOX 1010, and a chemical forming agent HYDROCEROL BIH were gravimetrically added along with the PICCOTAC B to barrel 9 at flow rates of 0.55 kilogram/hour and 0.725 kilogram/hour, respectively. The resulting adhesive mixture was metered to a 66 centimeters wide contact extrusion die with a rotating steel rod on the downstream side of the die gap to smear the adhesive onto the web. The adhesive was extruded at a rate of 125 pounds/hour (57 kilograms/hour, and coated onto a creped paper masking tape bucking. The die was deckeled down to 33.7 centimeters in width grid the paper backing was run at a line speed of 53.3 meters/minute, resulting in an adhesive coating thickness of 49 micrometers. The melt temperature was maintained at approximately 125° C. throughout the TSE and through the die. The coated web was then irradiated using an electron beam treatment in which the dose level per unit area was controlled to deliver 3 megarads (30 kilograys) to the tap surface of the adhesive coating.

Example 53 was prepared in the same manner as Comparative Example C12 except that CV60 and AMERIPOL 1011AC were gravimetrically added to barrel 1 of the TSE at a rate of 19.9 kilograms/hour, and 14.4 kilograms/hour, respectively. An immiscible thermoplastic additive ELVAX 260 was also gravimetrically added at pellets to barrel 1 at a rate 3.45 kilograms/hour. The PICCOTAC B tackifer was gravimetrically added to barrels 7 and 9 rate of 8.2 kilograms/hour and 9.6 kilogram/hour respectively. The IRGANOX 1010 and HYDROCEROL BIH were gravimetrically added along with the PICCOTAC B to barrel 5 at flow rates of 0.5 kilogram/hour and 0.7 kilogram/hour, respectively.

Example 54 was prepared in the same manner as Example 53, except that a lower melt viscosity EVA (ELVAX 410) was added instead of the ELVAX 260. Example 55 was prepared in the same manner as Example 54, except that the coated tape was not subjected to electron beam irradiation. The compositions and resulting tape properties for Comparative Example C12 and Examples 53–55 are presented in Tables 13 and 14, respectively.

TABLE 13

| Ex. | CV60 (parts) | AMERIPOL 1011AC (parts) | PICCOTAC B (phr) | ELVAX 260 (phr) | ELVAX 410 (phr) |
|---|---|---|---|---|---|
| C12 | 50 | 50 | 51.9 | 0 | 0 |
| 53 | 50 | 50 | 51.9 | 10.0 | 0 |
| 54 | 50 | 50 | 51.9 | 0 | 10.0 |
| 55 | 50 | 50 | 51.9 | 0 | 10.0 |

TABLE 14

| Ex. | ATG (g/mm) | Unwind Force (g/mm) | Drop Shear (min) | Drop Shear (min) | Hot Removal from Steel (% Transfer) |
|---|---|---|---|---|---|
| C12 | 51 | 29 | 5 | 680 | 1 |
| 53 | 50 | 23 | 52 | 281 | 0 |
| 54 | 60 | 25 | 71 | 353 | 1 |
| 55 | 54 | 23 | 12 | 8 | 2 |

The resulting PSA tapes were useful as masking tapes. Comparing the comparative example C12 to Examples 53–55, the reductions in unwind force and increases in drop shear are significant. In addition the development of superior drop shear compared to C13 in Example 55 without the use of electron beam irradiation curing is also significant.

Various modifications and alterations of the invention will become apparent to those skilled in the art without departing from the spirit and scope of the invention, which is defined by the accompanying claims. It should be noted that steps recited in any method claims below do not necessarily need to performed in the order that they are recited. Those of ordinary skill in the art will recognize variations in performing the steps from the order in which they are recited. For example in certain embodiments steps may be performed simultaneously. The accompanying claims should he constructed with these principles in mind.

What is claimed is:

1. A process for preparing a hot melt adhesive composition, the process comprising the steps of
providing at, least one non-thermoplastic hydrocarbon elastomer in a compounding device;
compounding at least one thermoplastic additive with the non-thermoplastic hydrocarbon elastomer to form a blend of the at least one non-thermoplastic hydrocarbon elastomer and the at least one thermoplastic additive, wherein a ratio of melt viscosity of the at least one thermoplastic additive to melt viscosity of the at least one non-thermoplastic hydrocarbon elastomer is less than about 1:20 when the melt viscosities are measured at a shear rate of 100 seconds$^{-1}$ at a processing temperature between about 80° C. and about 200° C.

2. The process of claim 1, further comprising the step of:
compounding at least one modifier with the blend of at least one non-thermoplastic hydrocarbon elastomer and at least one thermoplastic additive.

3. The process of claim 1, wherein the hot melt adhesive composition comprises a pressure-sensitive adhesive composition.

4. The process of claim 1, wherein the non-thermoplastic hydrocarbon elastomer has a number average molecular weight of greater than about 50,000 grams per mole.

5. The process of claim 1, wherein the non-thermoplastic hydrocarbon elastomer has a number average molecular weight of greater than about 100,000 grams per mole.

6. The process of claim 1, wherein the non-thermoplastic hydrocarbon elastomer has a number average molecular weight of greater than about 500,000 grams per mole.

7. The process of claim 1, wherein the non-thermoplastic hydrocarbon elastomer has a number average molecular weight of greater than about 1,000,000 grams per mole.

8. The process of claim 1, wherein the non-thermoplastic hydrocarbon elastomer has a viscosity average molecular weight of at least about 250,000.

9. The process of claim l, wherein the non-thermoplastic hydrocarbon elastomer comprises at least about 15% by weight of the total hot melt adhesive composition.

10. The process of claim 1, wherein the non-thermoplastic hydrocarbon elastomer comprises at least about 35% by weight of the total hot melt adhesive composition.

11. The process of claim 1, wherein the non-thermoplastic hydrocarbon elastomer is selected from the group consisting of natural rubber, butyl rubber, synthetic polyisoprene, ethylene-propylene rubber, ethylene-propylene-diene monomer rubber, polybutadiene, polyisobutylene, poly(alpha-olefin) rubbers, and styrene-butadiene random copolymer rubbers.

12. The process of claim 1, wherein the thermoplastic additive comprises a thermoplastic material.

13. The process of claim 1, wherein the thermoplastic additive comprises a styrenic-diene block copolymer.

14. The process of claim 1, wherein the thermoplastic additive is immiscible with the non-thermoplastic hydrocarbon elastomer.

15. The process of claim 1, wherein the thermoplastic additive has a melt viscosity of about 1 Pascal-second to about 1,000 Pascal-seconds when measured at the processing temperature.

16. The process of claim 1, wherein the thermoplastic additive has a melt viscosity of about 5 Pascal-seconds to about 500 Pascal-seconds when measured at the processing temperature.

17. The process of claim 1, wherein the thermoplastic additive has a melt viscosity of about 5 Pascal-seconds to about 100 Pascal-seconds when measured at the processing temperature.

18. The process of claim 1, wherein the thermoplastic additive has a melt viscosity of less than about 30 Pascal-seconds when measured at the processing temperature.

19. The process of claim 1, wherein the thermoplastic additive comprises at least about 1% to about 60% by weight of the hot melt adhesive composition based on total weight of the non-thermoplastic hydrocarbon elastomer.

20. The process of claim 1, wherein the thermoplastic additive comprises a thermoplastic homopolymer.

21. The process of claim 1, wherein the thermoplastic additive comprises a thermoplastic copolymer.

22. The process of claim 1, wherein the thermoplastic additive comprises at least one of a polyolefin homopolymer and a polyolefin copolymer.

23. The process of claim 1, wherein the thermoplastic additive comprises polyethylene.

24. The process of claim 1, wherein the thermoplastic additive comprises at least one of ethylene vinyl acetate and styrene-isoprene-styrene.

25. The process of claim 2, wherein the modifier comprises a tackifier.

26. The process of claim 2, wherein the modifier comprises a tackifier that is miscible with the non-thermoplastic hydrocarbon elastomer.

27. The process of claim 2, wherein the modifier comprises a processing aid.

28. The process of claim 1, wherein the process comprises continuous compounding process.

29. The process of claim 1, wherein the process comprises a batch compounding process.

30. The process of claim 1, wherein the thermoplastic additive is blended with the non-thermoplastic hydrocarbon elastomer prior to a first mastication section employed in the process.

31. The process of claim 1, wherein the compounding device comprises a continuous compounding device having a twin screw with a sequence of alternating conveying and processing sections.

32. The process of claim 31, wherein the process comprises blending the at least one non-thermoplastic hydrocarbon elastomer and the at least one thermoplastic additive in first conveying and processing sections of the continuous compounding device.

33. The process of claim 31, wherein the process comprises compounding the at least one modifier with the blend of at least one non-thermoplastic hydrocarbon elastomer and at least one thermoplastic additive in second conveying and processing sections of the continuous compounding device.

34. The process of claim 31, wherein the process comprises compounding a further modifier with the blend of at least one non-thermoplastic hydrocarbon elastomer, at least one thermoplastic additive, and at least one modifier in third conveying and processing sections of the continuous compounding device.

35. The process of claim 31, wherein the process comprises compounding a further non-thermoplastic; hydrocarbon elastomer with the blend of at least one non-thermoplastic hydrocarbon elastomer, at least one thermoplastic additive, and at least one modifier in third conveying and processing sections of the continuous compounding device.

36. The process of claim 35, wherein the at least one non-thermoplastic hydrocarbon elastomer comprises an aliphatic elastomer and the further non-thermoplastic hydrocarbon elastomer comprises an aromatic elastomer.

37. The process of claim 1, wherein the hot melt adhesive composition is formed at a throughput of greater than about 45 kilograms per hour per square meter cooling area.

38. A process for forming an adhesive coating, the process comprising the steps of:

preparing the hot melt adhesive composition according to the process of claim 1;

hot melt coating the hot melt adhesive composition to form the adhesive coating.

39. The process of claim 38, wherein the adhesive coating is formed at processing temperatures of less than about 200° C.

40. The process of claim 38, wherein the adhesive coating is formed at processing temperatures of shout 120° C. to about 160° C.

41. The process of claim 38, further comprising the step of crosslinking the adhesive coating.

42. The process of claim 1, wherein ratio of melt viscosity of the at least one thermoplastic additive to melt viscosity of the at least one non-thermoplastic hydrocarbon elastomer is less than 1:20.

43. The process of claim 1, wherein ratio of melt viscosity of the at least one thermoplastic additive to melt viscosity of the at least one non-thermoplastic hydrocarbon elastomer is less than about 1:25.

44. The process of claim 1, wherein ratio of melt viscosity of the at least one thermoplastic additive to melt viscosity of the at least one non-thermoplastic hydrocarbon elastomer is less than about 1:50.

45. The process of claim 1, wherein ratio of melt viscosity of the at least one thermoplastic additive to melt viscosity of the at least one non-thermoplastic hydrocarbon elastomer is less than about 1:100.

46. A process for forming an adhesive tape, the process comprising the steps of:

preparing the hot melt adhesive composition according to the process of claim 1;

hot melt coating the hot melt adhesive composition onto at least a portion of a tape backing.

47. A tape prepared according to the process of claim 46.

48. A hot melt adhesive composition, comprising:

at least one non-thermoplastic hydrocarbon elastomer, at least one thermoplastic additive, wherein a ratio of melt viscosity of the at least one thermoplastic additive to melt viscosity of the at least one non-thermoplastic hydrocarbon elastomer is less than about 1:20 when the melt viscosities are measured at a shear rate of 100 seconds$^{-1}$ at a hot melt processing temperature between about 80° C. and about 200° C; and at least one modifier.

* * * * *

UNITED STATES PATENT AND TRADEMARK OFFICE
CERTIFICATE OF CORRECTION

| | |
|---|---|
| PATENT NO. | : 6,613,381 B1 |
| APPLICATION NO. | : 09/762155 |
| DATED | : September 2, 2003 |
| INVENTOR(S) | : Bredahl, Timothy D. |

It is certified that error appears in the above-identified patent and that said Letters Patent is hereby corrected as shown below:

Column 2,
Line 53, delete "filler" and insert -- fillers --.

Column 8,
Line 58, after "conveying" insert -- section --.
Line 64, delete "conveyed" and insert -- conveying --.

Column 10,
Line 65, delete "not" and insert -- note --.

Column 12,
Table of Abbreviations
Row 3, line 1, after "having" insert -- a --.
Row 3, line 4, after "Akron" insert -- , --.
Row 5, line 4, after "supra" delete ",".
Row 6, line 2, delete "Pascal seconds" and insert -- Pascal-seconds --.

Column 13,
Row 11, line 1, delete "tackifer" and insert -- tackifier --.
Row 12, line 1, delete "tackifer" and insert -- tackifier --.
Row 13, line 1, delete "tackifer" and insert -- tackifier --.
Row 15, line 4, delete "Arkon" and insert -- Akron --.
Line 51, after "in" insert -- the --.

Column 14,
Line 55, delete "tackifer" and insert -- tackifier --.

Column 15,
Line 38, after "1" delete "," and insert -- . --.
Line 40, delete "extender" and insert -- extruder --.
Line 43, delete "tackifer" and insert -- tackifier --.
Line 49, delete "154° C." and insert -- 150° C. --.
Table 3, line 63, delete "MML-100" and insert -- MM L-100 --.

UNITED STATES PATENT AND TRADEMARK OFFICE
CERTIFICATE OF CORRECTION

PATENT NO. : 6,613,381 B1
APPLICATION NO. : 09/762155
DATED : September 2, 2003
INVENTOR(S) : Bredahl, Timothy D.

It is certified that error appears in the above-identified patent and that said Letters Patent is hereby corrected as shown below:

Column 16,
Table 3, line 4, delete "MML-100" and insert -- MM L-100 --.
Line 18, delete "induced" and insert -- reduced --.
Line 25, delete "cm" and insert -- on --.
Line 26, delete "basal" and insert -- based --.
Line 31, delete "K-Trop" and insert -- K-Tron --.
Line 32, delete "tackifer" and insert -- tackifier --.
Line 34, delete "117" and insert -- 107 --.
Line 36, delete "led" and insert -- fed --.
Line 58, delete "duality" and insert -- quality --.
Line 65, delete "rubber-based" and insert -- rubber based --.

Column 17,
Line 30, delete "14 10" and insert -- 8-10 --.
Line 32, delete "duality" and insert -- quality --.
Line 34, delete "147° C." and insert -- 149° C. --.

Column 18,
Line 40, delete "PSA" and insert -- PSAs --.
Line 46, after "Incorporated" insert -- ; --.
Line 47, delete "tackifer" and insert -- tackifier --.

Column 19,
Line 52, after "glass" delete ",".
Line 58, delete "C5" and insert -- C8 --.

Column 20,
Lines 2 and 61, delete "tackifer" and insert -- tackifier --.
Line 19, delete ":" and insert -- ; --.
Line 47, delete "black" and insert -- block --.
Line 47, after "(KRATON G-1726X)" delete ".".
Line 52, after "C9" delete ")".
Line 55, delete "rubber-based" and insert -- rubber based --.
Line 60, delete "K-Trop" and insert -- K-Tron --.

UNITED STATES PATENT AND TRADEMARK OFFICE
CERTIFICATE OF CORRECTION

PATENT NO. : 6,613,381 B1
APPLICATION NO. : 09/762155
DATED : September 2, 2003
INVENTOR(S) : Bredahl, Timothy D.

It is certified that error appears in the above-identified patent and that said Letters Patent is hereby corrected as shown below:

Column 21,
Lines 4, 28, 29 and 42, delete "tackifer" and insert -- tackifier --.
Line 12, delete "an" and insert -- at --.
Line 35, delete "(10" and insert -- C10 --.

Column 22,
Line 1, delete "mural" and insert -- natural --.
Line 19, delete ":" and insert -- ; --.
Line 22, after "Company;" delete ".".
Line 31, delete "38.3" and insert -- 28.3 --.
Liine 31, after "kilograms/hour" insert -- , --.
Line 35, delete "For" and insert -- for --.
Line 35, after "1-14" insert -- . --.

Column 23,
Line 13, delete "duality" and insert -- quality --.
Line 21, delete "haled" and insert -- based --.
Lines 30, 35 and 58, after "kilograms/hour" delete ",".
Line 31, after "elastomers" insert -- , --.
Line 35, delete "C8" and insert -- 9 --.
Line 37, delete "forming" and insert -- foaming --.
Line 44, delete "kilograms/hour," and insert -- kilograms/hour) --.
Line 45, delete "bucking" and insert -- backing --.
Line 46, delete "grid" and insert -- and --.
Line 53, delete "tap" and insert -- top --.
Line 60, delete "at" and insert -- as --.
Line 61, after "rate" insert -- of --.
Line 61, delete "tackifer" and insert -- tackifier --.
Line 62, delete "rate" and insert -- rates --.
Line 63, after "kilograms/hour" insert -- , --.

UNITED STATES PATENT AND TRADEMARK OFFICE
CERTIFICATE OF CORRECTION

PATENT NO. : 6,613,381 B1
APPLICATION NO. : 09/762155
DATED : September 2, 2003
INVENTOR(S) : Bredahl, Timothy D.

It is certified that error appears in the above-identified patent and that said Letters Patent is hereby corrected as shown below:

Column 24,
Line 33, after "addition" insert -- , --.
Line 34, delete "C13" and insert -- C12 --.
Line 43, After "example" insert -- , --.
Line 43, after "embodiments" insert -- , --.
Line 44, delete "he" and insert -- be --.
Line 48, after "steps of" insert -- : --.
Line 49, after "at" delete ",".

Column 25,
Line 15, delete "claim l" and insert -- claim 1 --.
Line 61, delete "1 ," and insert -- 1, --.

Column 26,
Line 6, after "comprises" insert -- a --.
Line 36, after "non-thermoplastic" delete ";".
Line 60, delete "shout" and insert -- about --.

Column 28,
Line 5, delete "," and insert -- ; --.

Signed and Sealed this

Eleventh Day of July, 2006

JON W. DUDAS
*Director of the United States Patent and Trademark Office*